INVENTOR.
ALLEN B. ROSENSTEIN
BY
ATTORNEY

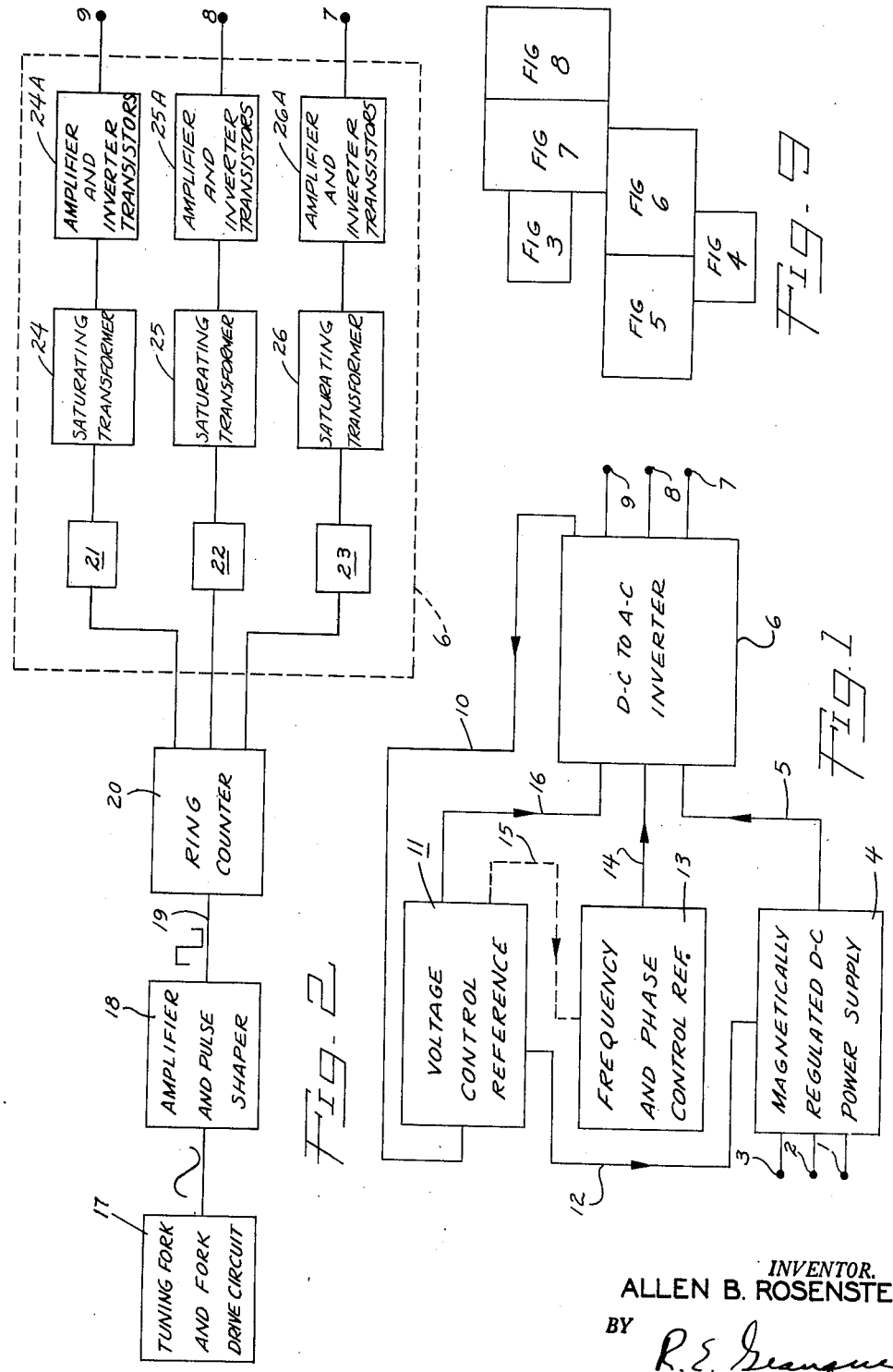

INVENTOR.
ALLEN B. ROSENSTEIN
BY R.E. Geauque
ATTORNEY

INVENTOR.
ALLEN B. ROSENSTEIN
BY
R. E. Geauque
ATTORNEY

INVENTOR.
ALLEN B. ROSENSTEIN

United States Patent Office 3,200,321
Patented Aug. 10, 1965

3,200,321
CONVERTER SYSTEM
Allen B. Rosenstein, West Los Angeles, Calif.
(314 S. Rockingham Ave., Los Angeles, Calif.)
Filed Aug. 31, 1960, Ser. No. 53,125
8 Claims. (Cl. 321—3)

This invention relates to apparatus for accomplishing frequency conversion and/or amplitude regulation of electrical power and novel improvements therein.

Alternating-current frequency and amplitude regulating apparatus have been proposed heretofore; many of these employ electro-mechanical elements and those which are purely electrical in nature have generally been unduly complex and expensive. The apparatus of the present invention employs all solid-state and magnetic elements to perform the required conversion and control functions. The various novel features may be illustrated by examining an embodiment in which three-phase alternating current, which is unregulated both as to amplitude and frequency, is supplied to the input and three-phase alternating current which is precisely regulated, relative to both frequency and amplitude, is supplied at the output at substantial power levels. The inverter of the invention regulates the output amplitude by varying the notch width of the train of pulses constituting the A.-C. power, at an appropriate point in the system.

Prior inverters have generally employed electromechanical devices such as vibrators or motor generators to affect the conversion from D.-C. to A.-C. Also, in those instances in which the amplitude of a D.-C. voltage is to be increased, it has been necessary to convert the D.-C. to an alternating current to permit it to be stepped-up via a transformer after which it is rectified to obtain a D.-C. voltage at the new, higher voltage level. Again, in these instances, electromechanical devices have been employed for D.-C. to A.-C. conversion. More recently, static elements have been employed and in particular, transistors for switching the D.-C. input in order to provide an alternating current for transformation. However, the novel techniques of the present invention have not been used, heretofore, for controlling the current amplitude in the output. Also, according to the present invention, there is shown an inverter modification which will provide a three-phase output. This configuration or embodiment of the invention will provide a three-phase A.-C. power output which may be continuously regulated as to frequency and amplitude.

It is, therefore, an object of the invention to provide a novel and improved electrical power conversion system employing static elements.

It is another object of the invention to provide novel and improved apparatus for regulating the frequency of an alternating current supply.

Another object of the invention is to provide novel and improved means for regulating the amplitude of an electrical power supply.

Still another object of the invention is to provide novel means for controlling the phase sequence of a polyphase alternating current supply.

Yet another object of the invention is to provide a novel D.-C. to A.-C. inverter employing pulse-width modulation for control of the output power.

A further object of the invention is to provide novel saturating-transformer means useful in the control of alternating-current power supplies.

These and other objects of the invention will become more apparent upon reviewing the following specification and drawings in which:

FIGURE 1 is a simplified block diagram of a converter system embodying the invention.

FIGURE 2 is an expanded block diagram of a portion of the system in FIGURE 1 illustrating certain features of the novel frequency and phase control apparatus of the invention.

FIGURE 9 is a diagram illustrating the relationship of the circuit portions of the system illustrated in FIGURES 3 through 8.

Figure 3:
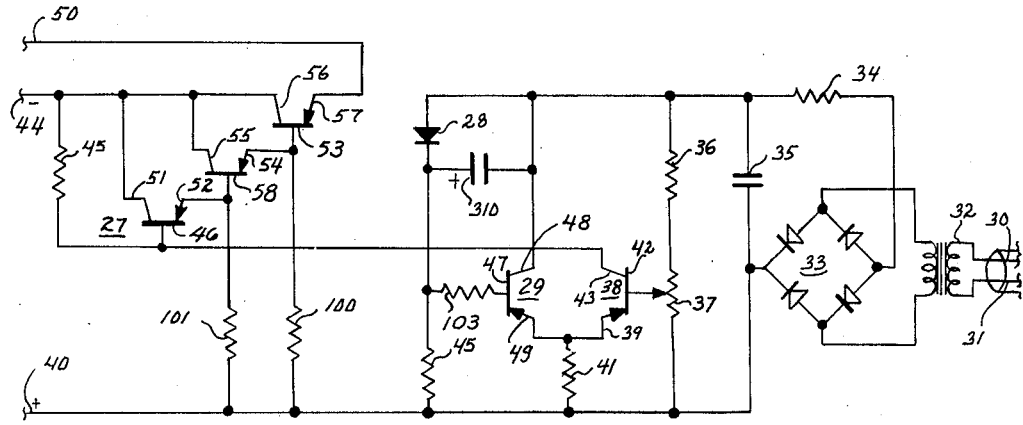
FIGURE 3 is a schematic diagram of the voltage control reference portion of the system.

The basic elements comprising a preferred embodiment of the system are shown in FIGURE 1. The raw (unregulated) three-phase A.-C. power is supplied to input terminals 1, 2 and 3 of a magnetically-regulated D.-C. power supply 4. This regulated power supply converts the raw A.-C. into a D.-C. voltage, appearing on line 5, which is precisely regulated as to amplitude. The regulated D.-C. power is supplied via line 5 to a static D.-C. to A.-C. inverter 6. This inverter converts the regulated D.-C. into three-phase A.-C. available at output terminals 7–9. A portion of the output A.-C. power is supplied via line 10 as the signal or "sense" input to a voltage control reference 11. A constant D.-C. voltage from the voltage control reference is supplied via line 12 as the amplitude standard for the magnetically-regulated D.-C. power supply 4. Alternatively, the constant D.-C. voltage may be supplied via 15 to control the output amplitude, as will be discussed more fully in a subsequent section. A tuning fork and a ring-of-three binary chain comprising the frequency and phase control reference respectively, 13 are used to control the operation of the D.-C. to A.-C. inverter 6 via control line 14. There is shown in FIGURE 2 a block diagram illustrating additional details of the frequency and phase control reference 13 and the inverter portions of the system of FIGURE 1.

The basic frequency standard of the system is obtained from a tuning fork 17 or other precision frequency reference element of any suitable and well-known type. The sinusoidal frequency signal from the tuning fork 17 is amplified and shaped into a square wave through pulse shaper 18 and supplied to the input bus 19 of a ring-of-three cascaded binary counter 20. Each binary flip flop of the counter ring controls a corresponding switching circuit of the inverter 6 via a corresponding emitter follower 21–23. The counter ring has feedback connections which are arranged so that counting can occur only in a given sequence, regardless of their starting condition or the manner in which they are originally turned on. This will assure the proper phase sequence under all operating conditions. The emitter followers drive the inverter switching circuits associated with the saturating transformers (24–26).

Control of the pulse train notch width in the inverter circuit is employed to maintain the voltage output of the inverter. The operation of the self-saturating transformer circuitry utilized in the inverter will be discussed in greater detail in a subsequent portion of this specification.

FIGURES 3–8 may be keyed into an overall schematic by arranging them in the manner shown in the layout of FIGURE 9.

The circuitry of FIGURE 3 comprises the voltage control reference portion of the apparatus and serves to generate a fixed or regulated D.-C. level which is used as a reference and/or bias control voltage, as will later become apparent.

The A.-C. "sense" signal to the voltage control reference is derived from one leg of the output A.-C. via terminals 30 and 31. The voltage is stepped-down via transformer 32 and applied to a full-wave, bridge rectifier 33. The D.-C. output from bridge rectifier 33 is smoothed via the R.-C. network comprised of series resistance 34 and shunt capacitance 35. A reference voltage derived from zener diode 28 is compared with the rectified A.-C. voltage "sense" signal developed across resistor 36 and potentiometer 37. This voltage is picked off potentiometer 37 for comparison against the zener reference voltage and is applied to a difference amplifier comprising transistors 29 and 38. The emitter 39 is referenced to the positive D.-C. power supply terminal 40 via resistor 41. The output is obtained from the collector 43 and is returned to the negative terminal of the power supply 44 via resistor 45. The output from the difference amplifier is applied to the base 46 of transistor 27. Transistor 27 is the first stage of a three-stage cascaded zener amplifier of the so-called "Darlington" type circuit. The current applied to base 46 is amplified and applied to the base 58 via emitter 52. The current flowing in the base 58 of the second stage is applied via the emitter 54 to base 53 of the third stage. The regulated output is available at emitter 57 and is supplied to the regulated circuitry on lead 50; the return circuit being through line 40. Collectors 51, 55 and 56 are connected to the negative terminal 44 of the D.-C. supply. Operating bias potentials are developed across resistors 45, 100–101, and 103.

The regulated D.-C. output appearing on line 50 is used to supply the control windings of the magnetically-regulated power supply of FIGURE 4 in the manner described below, except in the case of an alternative embodiment as will be described later.

Figure 4:
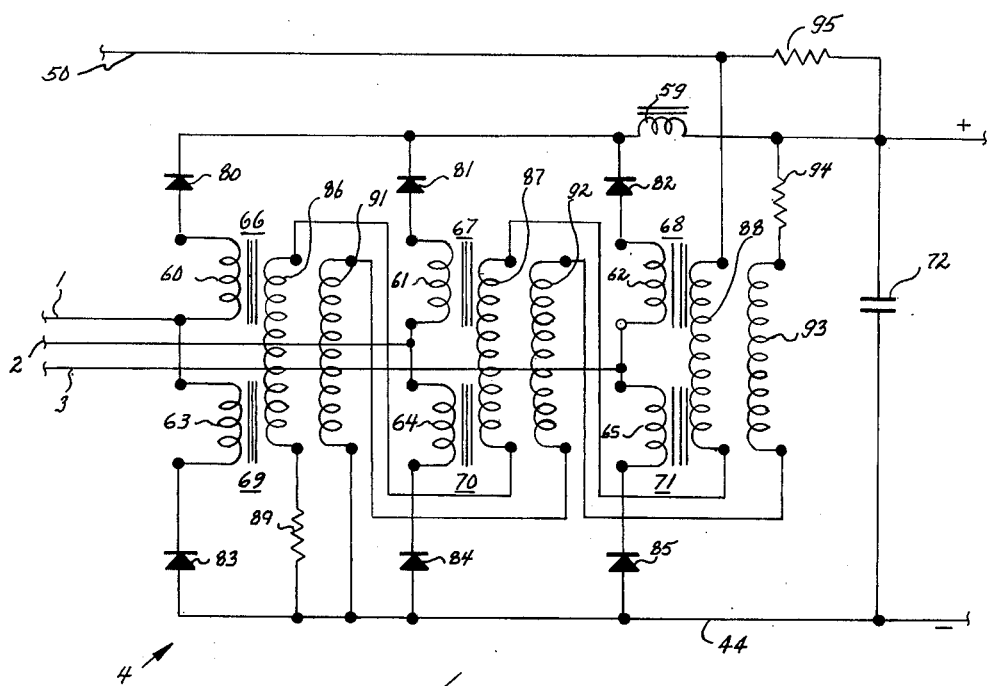
FIGURE 4 is a schematic diagram of the magnetically-regulated D.-C. power supply portion of the system.

Looking now at FIGURE 4 there is shown the magnetically regulated power supply portion of the system for converting the raw three-phase alternating current to a regulated direct current. The power windings 60–65 of self-saturating reactors 66–71, respectively, are connected with diodes 80–85 to provide full wave rectification; control windings 86–88 are connected in series. The series connected control windings 86–88 are connected to terminal 50 of the voltage control reference and are returned to the negative terminal 44 via series resistor 89. The control current on line 50 is obtained from the output of the voltage control circuit shown in FIGURE 3. The rectified output is smoothed by series reactor 59 and shunt capacitor 72. Reactors 66–71 are provided with bias windings 91–93 which are powered from the output D.-C. via series resistor 94.

The D.-C. output is also connected to the D.-C. control voltage appearing on line 50 through resistor 95. The smoothed and regulated D.-C. power is supplied to the input of the D.-C.-to-A.-C. inverter shown in FIGURES 6–8.

Figure 5:
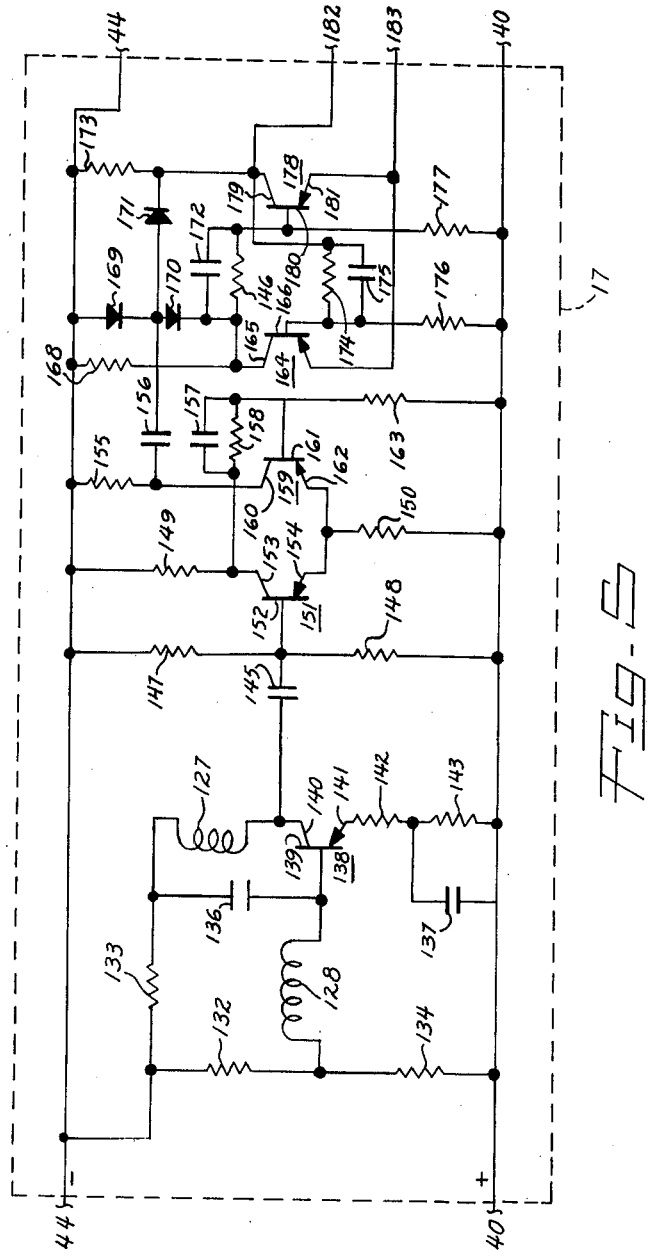
FIGURE 5 is a schematic diagram of the frequency control reference portion of the system.

Looking now at FIGURE 5 the basic frequency reference is derived from a tuning fork or other stable resonator of any suitable and well-known construction having a driving coil and a pick-up coil for supplying a precise frequency output signal. The drive coil 127 and the pick-up coil 128 are included in the oscillator circuit of transistor 138.

The D.-C. power is supplied to the frequency control circuit on line 44 and is returned to the positive terminal on line 40. The drive coil 127 is driven from collector 140 and the feedback signal from the pick-up coil 128 is returned to the base 139 of transistor 138. Shunt capacitor 136 is placed across the drive coil. Emitter 141 is returned to the positive power supply via resistors 142 and 143; the latter being bypassed by capacitor 137. Operating potentials for the circuit are derived via resistors 132–134.

The output from the fork-driven oscillator is R.C. coupled through the network comprising capacitor 145 and resistor 148 to the input of a Schmitt trigger comprising transistors 151 and 159. Cross-coupling between the collector 153 and base 161 is via capacitor 157 and resistor 158. Bias and operating potentials appear across resistors 147 through 150, 155, and 163.

The output from the Schmitt trigger is coupled via capacitor 156 to the input of a binary trigger comprising transistors 164 and 178. The binary trigger serves as the input binary to the ring counter; it is a bi-stable circuit having the collector 165 cross-coupled to the base 180 via resistor 146 and capacitor 172; similarly, collector 179 is coupled to base 166 via resistor 174 and capacitor 175. Diodes 169–171 serve as clamps to limit the excursion of the pulses developed by the circuit, and to provide only positive-going output pulses. Operating and bias potentials are developed across resistors 173, 176, and 177. The output of the binary appears on line 182. Line 183 is returned to the positive D.-C. supply terminal through a decoupling network.

The binary operates only on the positive-going pulses in order to provide the exact phase spacing and/or sequencing required, thus overcoming the shortcomings of prior circuits which have attempted to count both the positive- and negative-going pulses with resulting phase ambiguity.

Figure 6:
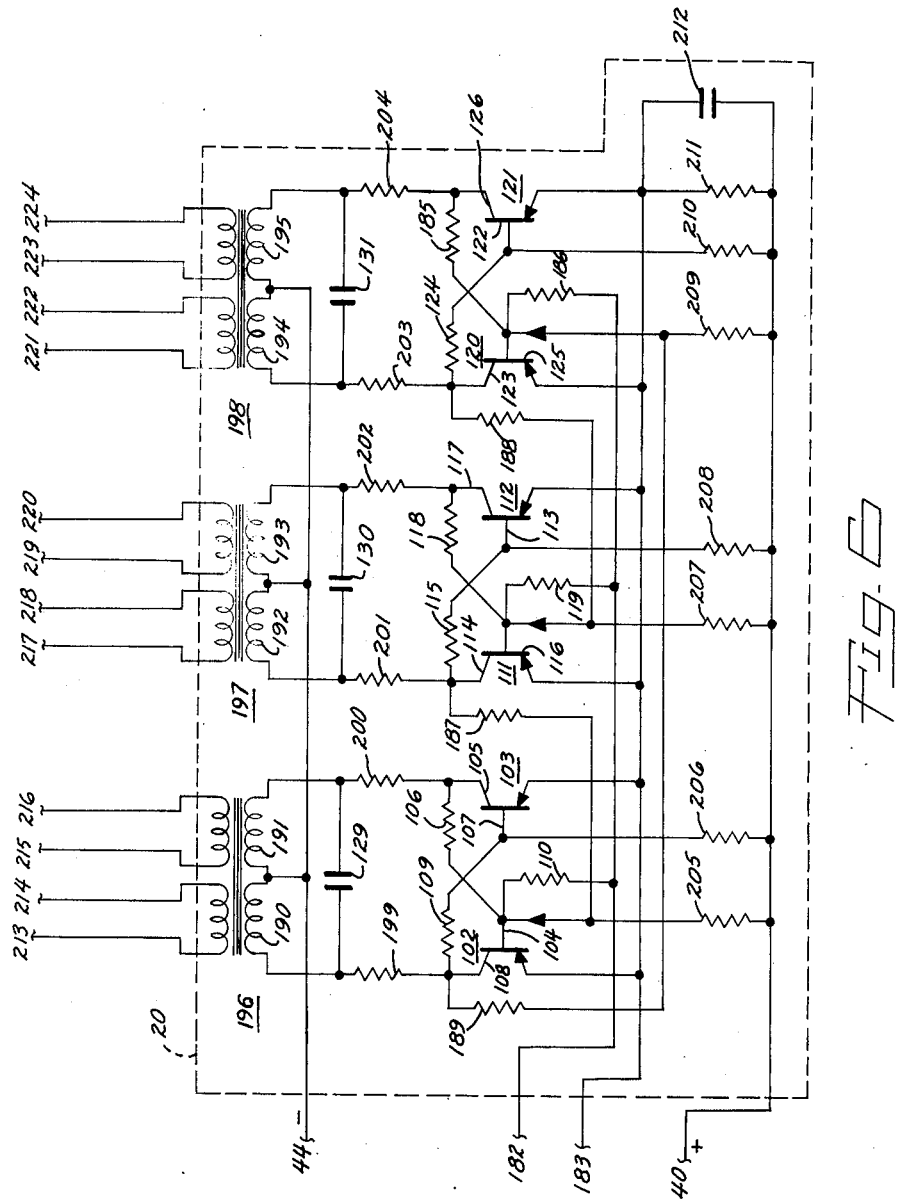
FIGURE 6 is a schematic diagram of the phase sequencing control portion of the system.

Looking now at FIGURE 6, the ring counter comprises three cascaded binary stages for providing the phase-synchronizing signals to the inverter. The square-wave driving signal is supplied on line 182. The first binary stage comprises transistors 102 and 103; the base 104 being cross-coupled to the collector 105 via resistor 106. Similarly, base 107 is cross-coupled to collector 108 via resistor 109. The input square wave is injected to the base 104 via resistor 110.

The second stage, comprising transistors 111 and 112, is similar to the first stage in that base 113 is cross-coupled to the collector 14 via resistor 115. Likewise, base 116 is cross-coupled to collector 117 via resistor 118. The input is injected to base 116 via resistor 119.

The third binary stage comprises transistors 120 and 121 and is similar to the two preceeding stages. Base 122 is cross-coupled to collector 123 via resistor 124. Base 125 is cross-coupled to collector 126 via resistor 182. The input is injected to base 125 via resistor 186.

The emitters of transistors 102, 103, 111, 112, 120 and 121 are connected in common to line 183 which is in turn coupled to the positive terminal of the D.-C. supply through a decoupling network.

The output of the second stage (111–112) is fed back to the input of the first stage (102–103) via resistor 187. Similarly, feedback from the output of the third stage (120–121) is coupled to the input of the second stage (111–112) through resistor 188. The output from the first stage is connected to the input of the third stage through resistor 189. These feedback inter-connections control the sequence in which the ring-of-three will trigger; this sequence is independent of the starting condition of the ring. The outputs of each of the three stages are supplied to the input windings 190 through 195 of corresponding matching transformers 196 through 198 via resistors 199 through 204. The center taps of the input windings of these transformers are returned to the negative terminal of the D.-C. supply. Operating potentials are developed across resistors 205 through 211; decoupling capacitor 212 is shunted across the emitter supply. Capacitor 129 is shunted across input windings 190 and 191 to suppress transients and provide better commutation. Similarly, transient-suppression capacitor 130 is shunted across windings 192 and 193; and, transient-suppression capacitor 131 is shunted across windings 194 and 195.

Figure 7:
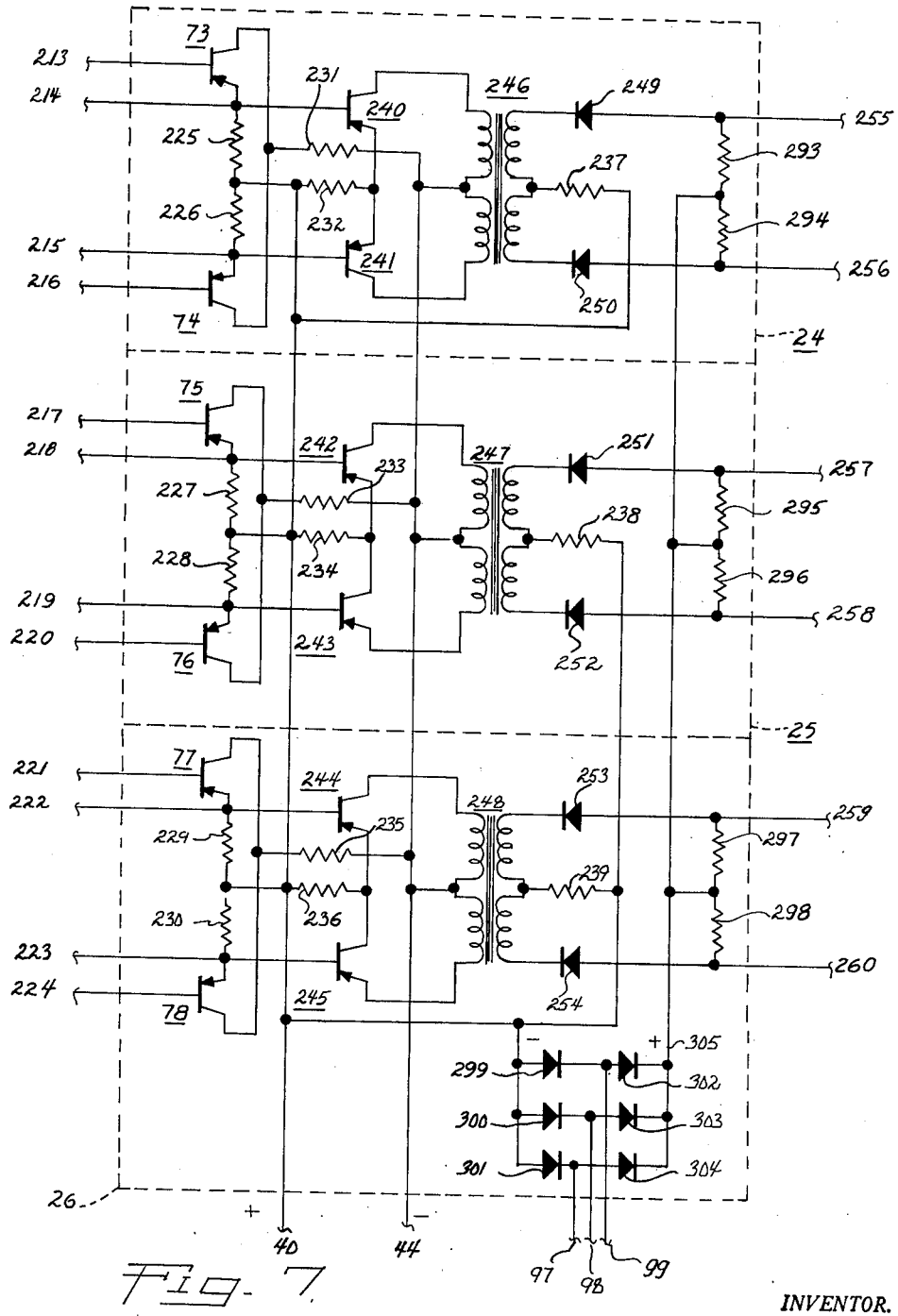
FIGURE 7 is a portion of the inverter circuitry of the system.

The outputs of transformers 196 through 198 are sent via lines 213 through 224 to the inputs of emitter followers 73 through 78, as shown in FIGURE 7. Transistors 73 through 78 are emitter followers cascaded into transistors 240 through 245, thereby comprising a series of two-stage amplifiers. The emitters of transistors 73–78 are returned to the positive power supply terminal 40 via resistors 225–230. Similarly, the emitter of transistors 240–245 are connected to the positive power supply terminal through resistors 232, 234, and 236. The collectors of transistors 240–241 are returned to the negative supply terminal 44 via resistor 231. Similarly, the collectors of transistors 75–76 and 77–78 are returned to the negative supply via resistors 233 and 235, respectively. The outputs of the two-stage amplifiers drive the input windings of saturating transformers 246 through 248.

Since the amplified signal is an overdriven sine wave, transistors 240–245 act as switches. For example, this will cause transistor switch 240 to open while transistor switch 241 closes, therefore, the voltage will be applied to the core of saturating transformer 246 first and then in the opposite direction. If the D.-C. voltage available at the saturating transformer is increased, its core will saturate sooner during the half cycle and, therefore, the notch width of the output square wave is increased. By controlling the D.-C. voltage appearing across lines 40 and 44, which may be controlled with a relatively low power level signal, the resulting change in the notch width will result in a large degree of control in the output power amplitude.

Figure 8:
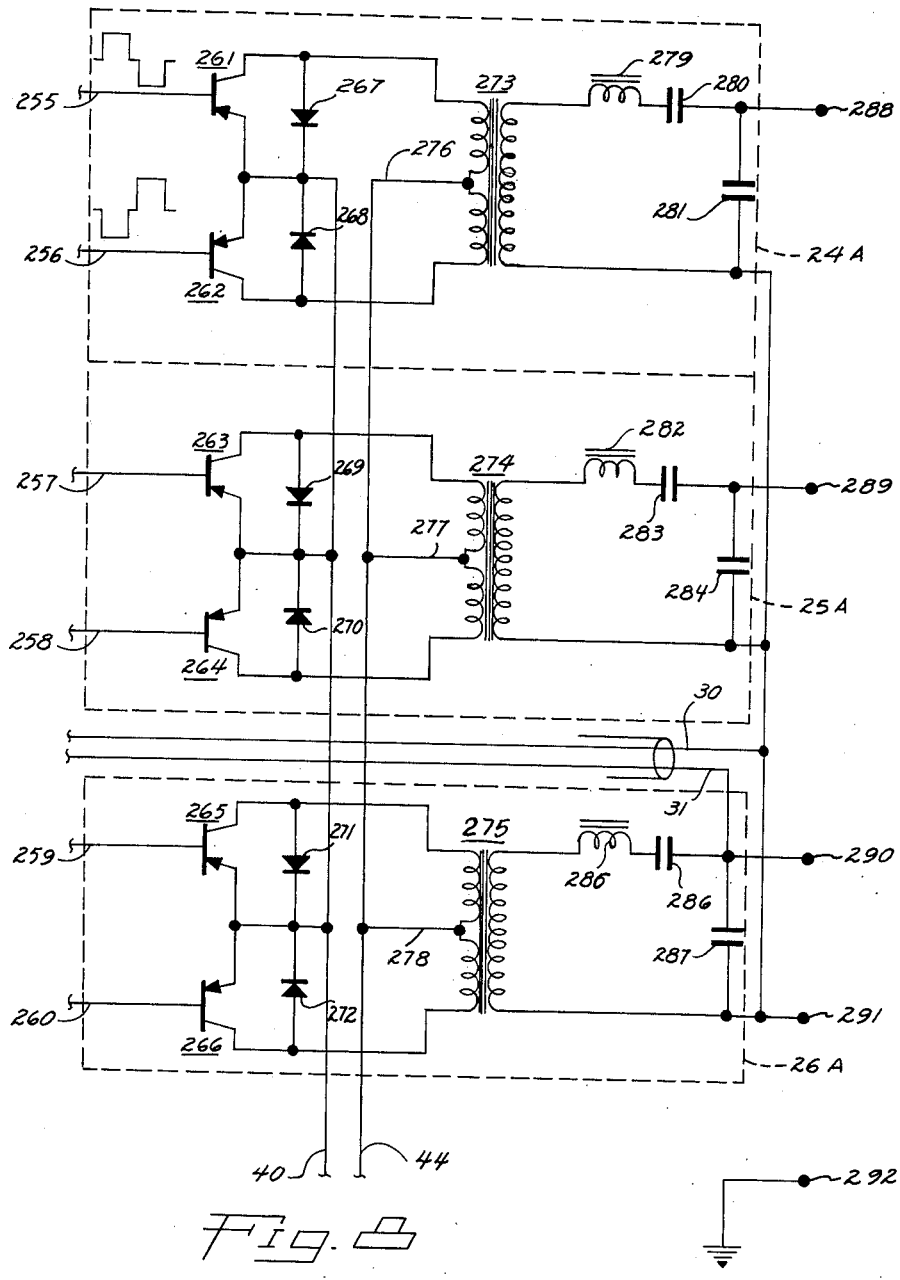
FIGURE 8 is a schematic diagram of the inverter output circuitry portion of the system.

The A.-C. output from the saturating transformers 246–248 is coupled through diodes 249–254 to the inverter power transistors 261–266 through corresponding pairs of lines 255–260 (see FIGURE 8). The center tap of the output winding of each saturating transformer (246–248) is returned to the positive terminal of the D.-C. supply via corresponding ones of current limiting resistors 237–239. A bias voltage is obtained from the three-phase A.-C. input, applied to terminals 97–99, by rectification via the full-wave rectifier comprising diodes 299–304. The positive bias potential is applied to the inverter circuit at the junction between pairs of resistors associated with each section of the inverter (293–298).

It is necessary to switch one transistor of each pair off, and allow the minority carriers to disappear, before the alternate transistor of the pair is switched on; otherwise, large circulating currents will exist which will decrease the efficiency of the circuit. The outputs of the inverter power transistors 261–266, shown in FIGURE 8, are coupled to output transformers 273–275. The negative terminal of the D.-C. supply is connected to input winding center taps 276–278; the negative terminal of the D.-C. supply is connected to the common junction between the emitters of corresponding pairs of inverter power transistors 261–266. Protective diodes 267–272 are shunted across the emitter and collectors of each of the inverter power transistors.

Inasmuch as the control voltage applied to the control winding of the magnetically-regulated D.-C. supply provides a fixed D.-C. power to the power transistors 261–266 of the inverter circuit, the output amplitude may be controlled by varying the notch width of the rectangular pulses generated by transistors 73–78 and 240–245, in the inverter circuit of FIGURE 7.

Notch-width control is only one means for controlling the amplitude of the output A.-C. voltage. The alternative mode requires that the notch width remain fixed. In this instance, the saturating transformer is used only to provide good commutation of the power transistors. The magnetically-regulated supply need not be used in the system; as an alternative embodiment of the invention, the notch width may remain fixed and by controlling the total D.-C. voltage available to the power transistors 261–266 the output amplitude may be regulated. Since the regulated supply 4 is not employed in this embodiment, line 12 of FIGURE 1 would be deleted and line 15 would be used; the D.-C. control is applied directly via line 5. Looking again at FIGURES 7–8, transistors 240–245 act as switches and switch essentially square-wave voltage to the primaries of transformers 246–248. The D.-C. voltage available to transistors 261–266 of the inverter circuit is then selectively controlled to provide the desired output amplitude.

The output windings of transformers 273–275 are each connected to a low-pass A.-C. filter tuned to pass the desired A.-C. output frequency. Each filter is comprised of a series inductance (279, 282, 286), a series capacitance (280, 283, 286), and a shunt capacitance (281, 284, 287). These filters remove the high-frequency components from the rectangular output waves and thereby provide essentially sine-wave output power. The regulated A.-C. output power is available on terminals 288–292 and is available as a Y-connection output configuration. It will, however, be obvious to those skilled in the art that other output configurations, such as a delta-connection, may be employed without departing from the principles of the invention. Other modifications will also now be apparent. For example, a three-phase system has been shown in order to best illustrate the principles of the invention. Obviously the number of phases may be increased or decreased without departing from the intended scope of the invention. Also it should be understood that certain portions of the preferred embodiments shown may be deleted, such as output filters, protective elements, etc., if not required in a specific application.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:

1. A converter system for converting a D.-C. input to a polyphase alternating current output comprising, inverter means having a pair of input terminals connected with said D.-C. input and a plurality of output terminals, said inverter means including a plurality of a saturating transformer means for cyclically switching said D.-C. input to provide polyphase alternating current at said output terminals, frequency standard means for generating a train of fixed frequency pulses connected with said saturating transformer means for controlling the cyclical switching rate thereof whereby the frequency of said A.-C. output from said inverter means corresponds to said fixed frequency, and ring counter means responsive to said frequency standard means for controlling the phase sequence of the polyphase A.-C. output at said output terminals.

2. A converter system for converting unregulated A.-C. input power to frequency-regulated and amplitude-regulated A.-C. output power, comprising; a magnetic-amplifier regulated D.-C. power supply connected to said A.-C. input power for providing regulated direct current from said unregulated A.-C. input power, cyclically switched inverter means having a pair of input terminals connected to the output of said D.-C. power supply and a plurality of output terminals from which is provided alternating current from said regulated direct current, frequency reference means for providing a train of fixed frequency pulses connected with said inverter means for controlling the cyclical switching rate of said inverter means whereby the frequency of the alternating current from said inverter means corresponds to the frequency of said pulse train, means connected to said output terminals for deriving a D.-C. control voltage from the alternating current from said inverter means, a source of fixed D.-C. reference voltage, means for comparing said D.-C. control voltage with said D.-C. reference voltage to provide a difference voltage representing the difference therebetween, and means connecting said difference voltage to said magnetic-amplifier regulated D.-C. power supply for controlling the amplitude of the direct current from said D.-C. power supply and thereby control the amplitude of said A.-C. output power at said output terminals.

3. A converter system for converting unregulated A.-C. input power to frequency-regulated and amplitude-regulated polyphase output power comprising, a magnetic-amplifier regulated D.-C. power supply connected to said A.-C. power input power for providing regulated direct current from said unregulated A.-C. input power, cyclically switched inverter means having a pair of input terminals connected to the output of said D.-C. power supply and a plurality of output terminals from which is provided polyphase alternating current from said regulated direct current, a source of fixed frequency pulses connected with said inverter means for controlling the switching rate of said inverter means and thereby regulate the frequency of the polyphase alternating current from said inverter means, rectifier means connected to said output terminals for deriving a D.-C. control voltage from one phase of said alternating current output from said inverter means, and means connecting said D.-C. control voltage to said magnetic-amplifier regulated D.-C. power supply for controlling the amplitude of the direct current from said magnetic-amplifier D.-C. power supply and thereby regulate the amplitude of said polyphase A.-C. output power at said output terminals.

4. A converter system as defined in claim 3, including ring-counter means responsive to said source of fixed frequency pulse for controlling the switching sequence of said inverter means and thereby regulate the phase of the polyphase A.-C. output power from said inverter means.

5. A system for regulating the amplitude of alternating current power comprising: converter means having an input for receiving alternating current and an output for providing direct current, inverter means connected to said output for reconverting said direct current to alternating current, rectifier means connected to the output of said inverter means for obtaining a direct current control signal proportional to the amplitude of the alternating current from said inverter means, a source of fixed D.-C. voltage, difference amplifier means having a pair of input terminals one of which is connected to said rectifier means and the other of which is connected to said source for comparing said D.-C. control signal with said fixed D.-C. voltage for providing a difference voltage representing the difference therebetween, means connecting said difference voltage to said converter means, said converter means being responsive to said difference voltage for varying the amplitude of the direct current provided by said converter means to said inverter means and thereby regulate the amplitude of the alternating current from said inverter means.

6. A system as defined in claim 5 wherein said converter means comprises a magnetic-amplifier regulated D.-C. power supply having control winding means, said control winding means being responsive to said difference voltage.

7. A system as defined in claim 5 wherein said inverter means comprises switching transistor means connected to said converter means, saturating transformer means having an input and an output, said input being connected to said transistor switching means whereby said transistor switching means supplies pulses of direct current to said saturating transformer means, said pulses being of alternating polarities, power transistor means connected to the output of said saturating transformer means, a plurality of output transformers connected to said power transistor means, and means for supplying D.-C. power to said power transistor means and to said output transformers.

8. In a converter system, a D.-C. to A.-C. inverter comprising: a source of D.-C. voltage, a plurality of switching transistor means each connected to said source, a plurality of saturating transformer means each having an input and an output, said inputs each being connected to corresponding ones of said transistor switching means whereby said transistor switching means supplies pulses of direct current to said saturating transformer means, said pulses being of alternating polarities, a plurality of power transistor means connected to the outputs of corresponding ones of said saturating transformer means, a plurality of output transformers connected to said power transistor means, means for supplying D.-C. power to said power transistor means and to said output transformers for conversion to alternating current, and means for controlling the amplitude of the D.-C. input power and thereby regulating the A.-C. output power.

References Cited by the Examiner
UNITED STATES PATENTS

| | | | |
|---|---|---|---|
| 2,548,737 | 4/51 | Morris | 331—45 |
| 2,916,687 | 12/59 | Cronin | 321—5 |
| 2,953,735 | 9/60 | Schmidt | 321—5 |
| 2,961,594 | 11/60 | Mah | 321—25 |
| 2,987,665 | 6/61 | Thompson | 321—2 |
| 3,125,726 | 3/64 | Clifton | 331—113.1 |

OTHER REFERENCES

Static Inverter Delivers Regulated 3-Phase Power, by M. Lilienstin; published in Electronics, July 8, 1960, vol. 33, No. 28, pages 55–59.

LLOYD McCOLLUM, *Primary Examiner.*

SAMUEL BERNSTEIN, *Examiner.*